United States Patent Office 3,503,940
Patented Mar. 31, 1970

3,503,940
POLYMERIZATION OF UNSATURATED MERCAPTANS TO POLYTHIOETHERS
Alexis A. Oswald, Mountainside, N.J., assignor to Esso Research and Engineering Company, a corporation of Delaware
No Drawing. Filed Nov. 15, 1966, Ser. No. 594,385
Int. Cl. C08f 3/84, 11/00
U.S. Cl. 260—79.7         13 Claims

ABSTRACT OF THE DISCLOSURE

Allyl and methallyl mercaptans or the dimer of allyl and methallyl mercaptans are reacted under free radical polymerization conditions to alpha-mercapto-omega-allyl-polytrimethylenethioethers.

---

The present invention relates to a process for the formation of polythioether addition products. More particularly, the present invention is directed to a process for the formation of higher molecular weight alpha-mercapto-omega-allyl - polytrimethylenethioethers by the poly-selfaddition of allylic mercaptan compounds.

The tendency of allylic mercaptans to undergo spontaneous selfaddition was first reported by J. V. Brown and R. Murjahn in Ber. 59, 1209 (1926). However, the materials formed under the conditions described by Brown and Murjahn are primarily dimers of allylic mercaptans and a small amount of trimer of the allylic mercaptans. Additionally, Ayers and Scott in U.S. 2,738,341 have taught the formation of polymeric substances from allylic mercaptans by oxidizing one mole of allyl mercaptan with one to eight moles of hydrogen peroxide or benzoyl peroxide. The products of this reaction were solid, relatively high molecular weight materials containing high percentages, e.g. 30%, of oxygen.

In accordance with the present invention, it has been found that polythioether addition products, in particular alpha-mercapto-omega - allyl-polytrimethylenethioethers having number average molecular weights varying from about 296 to about 50,000 can be formed by the poly-selfaddition of allylic mercaptan compounds. The additions are promoted or initiated by heat, irradiation, or with chemical free radical catalysts. The polythioethers formed can be readily modified and crosslinked to attractive vulcanizates. The polymerization is preferably carried out in two steps through an (allyl mercapto)-trimethylene-mercapto-propane thiol intermediate.

According to the preferred processing sequence, a monomeric allylic thiol having the general formula:

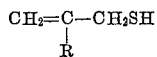

wherein R is a hydrogen or a methyl radical is reacted under mild conditions (standing at room temperature) and for a short reaction time to produce a dimer in substantial yield having the general formula:

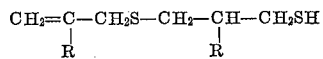

wherein R is a hydrogen or methyl radical. Thereafter, the dimer is purified using conventional distillation techniques and is further polymerized or copolymerized under more stringent free radical initiation conditions. With this process there is no need to utilize an essentially pure allylic mercaptan monomer in the first polymerization step. The dimer secured is less reactive and is more readily purified by distillation than the monomeric allylic mercaptan. Additionally, the products secured through the homopolymerization of the dimer tend to have a higher and more uniform molecular weight distribution than the products secured by the simple homopolymerization of the allylic mercaptan.

It is, of course, within the scope of the present invention to eliminate the first process step and polymerize in the second step a dimer of either allyl mercaptan or methallyl mercaptan formed using other techniques. For example, the composition formed by the dimerization of allyl mercaptan can also be produced by reacting allene with a molar excess of hydrogen sulfide to form trimethylene dithiol which is thereafter reacted with an excess amount of allene to form the desired product. Similarly, the composition formed by the dimerization of methallyl mercaptan can also be formed by the addition of hydrogen sulfide to dimethallyl sulfide.

The reactions contemplated by this invention may be represented by the following equations:

(I)  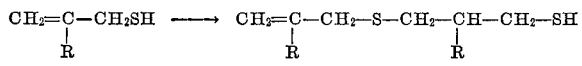

(II) 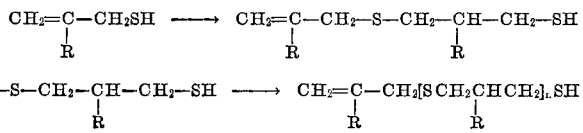

wherein R is either a hydrogen or methyl radical and $n$ varies from 3 to 600, preferably from 5 to 100. The product of Equation I is the dimer of allyl or methallyl mercaptan. The products of Equation II are the preferred alpha-mercapto - omega - allyl-polytrimethylenethioether products. These products are essentially colorless liquids or low melting solids having number average molecular weights varying from 296 to 50,000, preferably from 370 to 8,000.

The process for the production of the polythioether addition products can be carried out in bulk (absence of a diluent), in the presence of inert solvents, or with the use of water emulsion techniques. Low molecular weight polythioether products suitable as the base component in a mastic composition can be prepared most efficiently using bulk polymerization techniques, that is, carrying out both steps of the addition reaction in the absence of solvents. When higher molecular weight materials are desired, the second stage addition reaction is preferably carried out in the presence of an inert solvent or especially with the use of a typical water-surfactant emulsion system.

Useful inert solvents include saturated aliphatic hydrocarbons, halogenated saturated aliphatic hydrocarbons, aliphatic ethers, aliphatic thioethers and mixtures thereof. Representative nonlimiting examples of such solvents include pentane, cyclohexane, dimethyl sulfide, diethyl sulfide, etc. The use of aromatic hydrocarbons as solvents usually results in sharply reduced reaction rates and ofttimes leads to undesirable side reactions.

The conditions at which the first and second processing steps are conducted can vary over a wide range. In the first step of the process involving the dimerization of the allylic mercaptan reagent, the temperature during reaction should be maintained at about —100 to 150° C., preferably —80 to 80° C., for from 5 minutes to 12 hours, preferably 10 minutes to 6 hours, in the case of bulk addition reactions. Similar conditions should be used when the dimer is formed in the presence of a solvent. The emulsion technique is not used to prepare the dimers.

With respect to the second step of the polymerization process, for additions in bulk or in solvents, the reaction should be conducted at temperatures varying from −100 to 150° C., preferably −80 to 100° C., for periods varying from 10 minutes to 96 hours, preferably one to 24 hours. When emulsion techniques are utilized, the second step reaction should be carried out at temperatures varying from −15 to 100° C. for from 10 minutes to 2 hours.

Th first and second stage addition reactions are not critically sensitive to pressure. However, the pressure within the reaction zone during either the first or second step of the process must be sufficient to maintain the reactants in the liquid state at the temperatures used for the reaction. In general, pressures varying from one to 10 atmospheres, preferably atmospheric pressure, can be used.

While the first stage dimerization reaction and the second stage polyaddition reaction will proceed merely by heating the reagents, it is desirable to employ a free radical initiator to promote the formation of the desired products. Radiation such as ultraviolet light or gamma-radiation alone or in conjunction with the application of heat may be used to promote the addition reactions. Additionally, chemical free radical initiators such as organic peroxides, preferably alkyl peroxides, azo compounds, etc., may be used instead of radiation or in combination with it. Representative examples of useful chemical initiators include t-butyl hydroperoxide, bis-t-butyl peroxide, bis-azobutyronitrile, etc. Generally, only minor quantities of the chemical initiators are necessary to promote the addition reactions of the first and second steps of the process. Preferably, between 0.01 to 10 mole percent of chemical initiator is used based upon the number of moles of reactant present in the reaction zone.

The reaction vessel used for the addition reactions contemplated by the invention may be constructed of any material that is inert to the reactants and catalyst used and is capable of withstanding the operating pressures. Reaction vessels formed of stainless steel or glass-lined steel are satisfactory.

Although the polyaddition products formed with the process of this invention have many uses as intermediates because of the olefinic and sulfhydryl terminal functionality present on the polymer chains, they find particular utility as the base substituent for mastic compositions. The olefinic and sulfhydryl terminated products can be readily modified and then crosslinked to stable, rubbery 3-dimensional networks using a variety of techniques. For example, the olefinic functionality of the polymer can be reacted with tri- and/or polythiols such as the trithiolic ester derived from the reaction of mercapto propionic acid and trimethylol propane. Subsequently, the thiol terminals of the addition products can be bound into a crosslinked network by admixing the polymer with an epoxide compound having three or more epoxide groups per molecule and heating the resulting mixture in the presence of an amine catalyst. Alternatively, the reactive thiol terminals of the addition products may also be reacted with allylic acrylates, divinyl sulfone, diacrylates and other reactive diolefinic compounds.

Prior to curing operations, the addition product may be compounded with stabilizers, plasticizers, or extender oils and various types of fillers. Up to 200 parts of carbon black, finely divided petroleum coke, or other non-carbon fillers such as titanium oxide, magnesium oxide, etc., may be compounded with 100 parts of the polythioether. The cured mastic compositions are highly resistant to ozone and oxygen degradation and to attack by organic solvents, acids and bases. Hence, the cured materials find particular utility in automotive applications and the like.

The invention will be further understood by reference to the following examples.

EXAMPLE 1

Essentially pure allyl mercaptan was introduced into a fractional distillation apparatus and a mid-cut fraction boiling between 66 and 68° C. was removed from the distillation zone. Upon standing for about 24 hours, the allyl mercaptan readily dimerized. A nuclear magnetic resonance spectrum of the distillate taken after the distillate was permitted to stand indicated that the distillate consisted of about 25% allyl mercaptan monomer, 50% dimer, and about 25% trimer of allyl mercaptan.

About 150 grams of the monomer, dimer, trimer mixture was introduced into a quartz reaction vessel equipped with a magnetic stirrer and a nitrogen bubbler. The vessel was then sealed and positioned in a water bath maintained at about 40° C. The vessel contents were irradiated with constant stirring and nitrogen bubbling with a 75 watt high pressure mercury arc ultraviolet immersion lamp positioned about 6 centimeters from the reaction vessel. Radiation continued for 72 hours. Upon completion of the reaction period, the reaction mixture solidified at room temperature. A nuclear magnetic resonnace spectrum of the total product indicated that at least a portion of the total mixture had an alpha-mercapto-omega-allyl-polytrimethylene sulfide structure.

To remove any volatile, low molecular weight oligomer present, the reaction product was heated to 230° C. under vacuum conditions. After removal of traces of unreacted allyl mercaptan, 6 grams of dimer boiling between 50 and 60° C. at 0.3 millimeter of mercury pressure, 12 grams of trimer boiling between 70 and 75° C. at 0.3 millimeter of mercury pressure, and 3 grams of tetramer boiling between 100 and 110° C. at 0.3 millimeter of mercury were obtained as distillates. The residual product weighing about 125 grams was dissolved in 200 mls. of benzene and precipitated by dropping the solution into 2 liters of cold methanol. The precipitate was filtered from the benzene-methanol solution and the procedure repeated to yield 108 grams (66% yield) of a purified, dry product.

The purified product melted between 56 and 58° C. An osmometric molecular weight determination in benzene showed that the product had a number average molecular weight of about 5153. Elemental analysis indicated that the composition consisted of 48.68 wt. percent carbon, 8.17 wt. percent hydrogen, and 43.39 wt. percent sulfur. The calculated composition for an alpha-mercapto-omega-allyl-polytrimethylene sulfide composition was 48.60 wt. percent carbon, 8.25 wt. percent hydrogen, and 43.25 wt. percent sulfur. A determination of olefinic protons with a nuclear magnetic resonance spectrometer equipped with a time averaging computer showed the presence of an average 2.8 vinylic hydrogens per molecule, i.e. 93%, of the theoretical.

EXAMPLE 2

To demonstrate the desirability of forming the polythioether products through a dimer intermediate of an allylic mercaptan, two identical experiments were conducted following the procedure of Example 1 where a dimer was the sole reaction monomer and in a second experiment where freshly distilled monomer was the sole reaction monomer.

In the first experiment 30 grams of 3-(allyl mercapto)-propane thiol, the dimer of allyl mercaptan, obtained as a liquid boiling between 43 and 46° C. at 0.15 mm. on redistillation of the monomer-dimer mixture of the first example, was irradiated for 24 hours. Upon completion of the reaction period and subsequent purification of the product, it was found that a polyaddition took place yielding an alpha-mercapto-omega-allyl-polytrimethylene sulfide (by n.m.r. spectrophotometry) having a number average molecular weight as determined by osmometry in benzene of 444.

In the parallel experiment starting with freshly distilled allyl mercaptan monomer a similar polyaddition under identical conditions resulted in a polymer having a number average molecular weight of only 150.

EXAMPLE 3

One mole (88 grams) of methallyl mercaptan dimer was polymerized under the conditions of the previous example to yield a slightly yellow, viscous crude polymer. After the removal of the volatile compounds by heating the crude product for 2 hours at 135° C. under 0.05 mm. of mercury pressure, 80 grams (91%) of a liquid residual product was obtained. Its nuclear magnetic resonance spectrum indicated eight methallyl mercaptan units per molecule corresponding to a molecular weight of 704. The molecular weight determined by osmometry was 826.

EXAMPLE 4

One mole (88 grams) of methallyl mercaptan was irradiated under a nitrogen blanket with stirring in a quartz tube with a 75 watt Hanau high pressure ultraviolet immersion lamp having a mercury arc emitting a wide spectrum of U.V. irradiation at 16° C. for 48 hours. The reaction mixture was then heated to 135° C. in vacuo to remove the volatile components. In this manner 12 grams (13.6%) of methallyl mercaptan dimer was obtained. The subsequent fraction recovered, 7 grams (7.5%) of a colorless liquid boiling at 54 to 56° C. at 0.1 mm. of mercury pressure was the trimer of methallyl mercaptan. The liquid residue, 60 grams (68.2%), was a methallyl mercaptan polymer. Its n.m.r. spectrum indicated an average of five monomer units per molecule. This corresponds to a molecular weight of 440. A number average molecular weight determination by vapor phase osmometry gave a value of 446.

EXAMPLE 5

Crude methallyl mercaptan (1,000 grams) obtained by the reaction of methallyl chloride with sodium hydrogen sulfide was fractionally distilled. Analysis of the product by gas chromatography prior to distillation indicated that about 80% of the material was methallyl mercaptan, the remainder being primarily methallyl mercaptan dimer. Fractional distillation in vacuo yielded 500 grams (50%) methallyl mercaptan as a clear colorless liquid boiling at 29 to 30° C. at 65 mm. of mercury pressure and 260 grams (26%) of the dimer of methallyl mercaptan dimer boiling at 48 to 49° C. at 0.1 mm. of mercury pressure. According to nuclear magnetic resonance spectroscopy, the bulk of the distillation residue was the trimer of methallyl mercaptan.

Having thus described the general nature and specific embodiments of the present invention, the true scope is now pointed out by the appended claims.

What is claimed is:

1. A process for preparing a polythioether which comprises polymerizing unsaturated mercaptans consisting of allyl mercaptan dimers having the general formula:

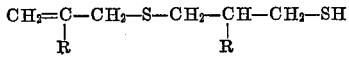

wherein R is selected from the group consisting of hydrogen and methyl in the presence of a free radical initiator selected from the group consisting of chemical free radical initiators, ultraviolet irradiation, gamma irradiation and mixtures thereof at a temperature of about −100° to about 150° C. for a time sufficient to obtain a polythioether adduct having the general formula:

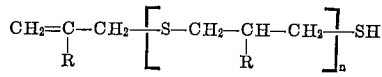

wherein $n$ is an integer of about 3 to about 600.

2. The process of claim 1 wherein the chemical free radical initiator is present at about 0.01 to about 10 mole percent based on the dimer.

3. The process of claim 1 wherein the chemical free radical initiator is an organic peroxide.

4. The process of claim 1 wherein $n$ varies from 5 to 100.

5. The process of claim 1 wherein R is a hydrogen radical.

6. The process of claim 1 wherein R is a methyl radical.

7. The presence of claim 1 wherein said reaction is conducted in the absence of a diluent at a temperature varying from −80 to 100° C. for from one to 24 hours.

8. The process of claim 7 wherein $n$ varies from 5 to 100.

9. The process of claim 1 wherein the free radical initiator is t-butyl hydroperoxide, bis-t-butyl peroxide, bis-azobutyronitrile or mixtures thereof.

10. A process for preparing a polythioether which comprises polymerizing methallyl mercaptan in the presence of ultraviolet irradiation at a temperature of about −100° to about 150° C. for a time sufficient to obtain a polythioether adduct having the general formula:

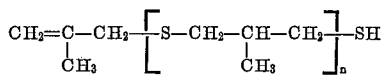

wherein $n$ is an integer of about 3 to about 600.

11. The process of claim 10 wherein $n$ varies from 5 to about 100.

12. The process of claim 10 wherein the reaction is carried out in the absence of a diluent at a temperature of about −80° to about 100° C. for about one to about 24 hours.

13. The process of claim 12 wherein $n$ varies from 5 to about 100.

References Cited

UNITED STATES PATENTS

| | | | |
|---|---|---|---|
| 2,563,383 | 8/1951 | Vaughn et al. | 260—79.7 |
| 2,738,341 | 3/1956 | Ayers | 260—79.7 |
| 3,315,000 | 4/1967 | Ransley. | |

OTHER REFERENCES

Reid, Org. Chem. of Bivalent Sulfur, 1960 vol. II, p. 34.
Tabushi et al.: Kogyo Kagoku Zasshi 67(3) C.A. 61, 16002(a), December 1964.

JAMES A. SEIDLECK, Primary Examiner

U.S. Cl. X.R.

204—159.22, 159.23; 260—609